United States Patent
Schmit et al.

(10) Patent No.: US 6,987,570 B1
(45) Date of Patent: Jan. 17, 2006

(54) REFERENCE SIGNAL FOR STITCHING OF INTERFEROMETRIC PROFILES

(75) Inventors: Joanna Schmit, Tucson, AZ (US); Artur Olszak, Tucson, AZ (US)

(73) Assignee: Veeco Instruments Inc., Tucson, AZ (US)

( * ) Notice: Subject to any disclaimer, the term of this patent is extended or adjusted under 35 U.S.C. 154(b) by 337 days.

(21) Appl. No.: 10/109,361

(22) Filed: Mar. 28, 2002

Related U.S. Application Data (63) Continuation of application No. 09/888,826, filed on Jun. 25, 2001, now Pat. No. 6,624,894.

(51) Int. Cl.
*G01B 9/02* (2006.01)

(52) U.S. Cl. .................................... 356/511

(58) Field of Classification Search ............... 356/511, 356/512, 513, 514, 515, 516, 489, 495, 479, 356/497, 2, 601
See application file for complete search history.

(56) References Cited

U.S. PATENT DOCUMENTS

| | | | |
|---|---|---|---|
| 5,061,071 A * | 10/1991 | Fujita et al. ................. | 356/489 |
| 5,122,648 A * | 6/1992 | Cohen et al. ............. | 250/201.3 |
| 6,069,700 A * | 5/2000 | Rudnick et al. ............. | 356/511 |
| 6,473,186 B2 * | 10/2002 | Kawasaki et al. ........... | 356/512 |
| 2002/0180983 A1* | 12/2002 | Ina et al. ..................... | 356/511 |

* cited by examiner

*Primary Examiner*—Hwa Andrew Lee
(74) *Attorney, Agent, or Firm*—Antonio R. Durando; Quarles & Brady Streich Lang LLP

(57) ABSTRACT

Composite height profiles are produced by taking successive interferometric measurements of different sections of a sample surface by sequentially placing them within the field of view of the instrument. A reference signal is used to provide a full history of scanner motion during each measurement scan. The reference signal is independent of the fringes collected for profile-measurement purposes and is used to produce a z-position history of the scan that is independent of scanner nonlinearities and other error sources. As a result, errors caused by scanner nonlinearity and lack of repeatability are removed from the process and it is possible to combine profiles of sections that are spatially disconnected without loss of precision attributable to scanner imperfections.

52 Claims, 10 Drawing Sheets

REFERENCE SIGNAL FOR STITCHING OF INTERFEROMETRIC PROFILES

CROSS REFERENCES TO RELATED APPLICATIONS

This application is a continuing application of Ser. No. 09/888,826, filed on Jun. 25, 2001 U.S. Pat. No. 6,624,894.

BACKGROUND OF THE INVENTION

1. Field of the Invention

This invention pertains to the general field of topographic profilometry and, in particular, to a technique for improving the process of stitching multiple maps obtained by independent profilometric measurements of a sample to form a composite map. More particularly, the invention relates to a stitching procedure for interferometric profilers.

2. Description of the Prior Art

It has become common practice in interferometric profilometry to combine profiles of adjacent sections of a sample surface to form a composite profile. Each section of the surface is profiled independently, thereby making it possible to retain with each successive measurement the optical resolution provided by the field of view corresponding to the size of the section being sampled. This process is commonly referred to in the art as a "stitching" procedure.

The x,y translation of the sample stage with reference to the interferometric objective may introduce tip, tilt and offset variations between measurements that require adjustments to the profile data in order to avoid errors. Such corrections are typically implemented by using information derived by measuring overlapping regions of adjacent sections of the sample surface. Another source of errors lies in the nonlinearity and lack of repeatability of the vertical motion of the scanner employed to produce the interferometric fringes that allow profiling of the sample surface. That is, the absolute position of the interferometric objective at the origin and during the step sequence of the scan may vary between measurements because of inertial and other effects, such that separate profiles cannot be reliably combined without appropriate correction. This is again accomplished by taking measurements of adjacent sections with overlapping regions, so that information relating to both sections can be obtained and used to normalize the profiles of the sections to a common reference surface.

For example, commonly owned U.S. Pat. No. 5,987,189, No. 5,991,461 and No. 6,185,315 describe techniques for correcting stitching errors introduced by the scanner and the x,y translation of the sample (or of the interferometric objective) between measurements of the various surface sections of interest. In essence, successive measurements of adjacent sections of the sample surface are taken by sequentially placing them within the field of view of the instrument and independently profiling each section by conventional interferometric procedures, such as phase shifting or vertical scanning interferometry. The x-y translation of the microscope between successive measurements is carried out by maintaining a region of overlap between sections, so that spatial continuity is retained between measurements. The height data generated for each section are then combined to form a larger image corresponding to the entire surface tested and discontinuities and/or errors introduced by the x-y translation process are corrected by normalizing the overlapping portions to a common reference plane. This is achieved by fitting a plane equation through each set of measured heights in the overlapping regions, and the tip, tilt and offset of one of the fitted planes are used to correct the height data of adjacent sections and produce matching overlapping profiles. The measured height data for the balance of the adjacent section are then also corrected by the same difference in tip, tilt and offset to obtain a continuous normalized image.

Other stitching techniques in the art also rely on overlapping measurement regions to provide the information necessary to normalize all data and provide a consistent composite map of the sample surface. This limitation requires redundancy of measurements and does not allow reliable stitching of data collected from sample sections separated by intervening unprofiled regions. While x,y positioning errors may be reduced to acceptable tolerances by using high-precision translation stages, similar precision hardware is not yet available to reduce to acceptable levels the z-axis (offset) errors produced by scanner-motion nonlinearity and non-repeatability. Therefore, no stitching method has yet been disclosed in the art that avoids the need for taking measurements of overlapping regions of profiled sections in order to obtain correlating information that can be used to calculate appropriate correction and produce reliable composite profiles. Thus, a stitching process that overcomes these shortcomings would be very desirable.

Another limitation of current profiler technology resides in the measurement of temporal changes occurring in sample surfaces or structures of interest. For example, the objective of a measurement may be to identify changes in the topography of a membrane as a result of its interaction with a chemical agent. That is obviously accomplished by profiling the sample at different times and comparing the results to calculate changes. Using prior-art profilometric techniques, these changes can be measured accurately only when at least a portion of the sample within the field of view remains unchanged. That is, the measurements related to the unchanged portion are used to provide a common reference from which changes can be calculated. Accordingly, it would also be very desirable to develop a process that allowed calculation of temporal surface changes when the entire sample within the field of view varies with time.

Commonly owned pending application Ser. No. 09/888,826 discloses the use of an optical reference signal dedicated to providing a full history of the scanner motion during interferometric measurements, thereby allowing a determination of scanning errors at each step. The reference signal is independent of the fringe information collected for measurement purposes during the scan. The concept may be implemented by utilizing an additional light source with the same scanner used for the measurement (with the same or a different detector), so that the optical path difference (OPD) varies in synchronization with both the reference-signal and the data-collection procedures. Alternatively, a high temporal-coherence filter and/or a reduced numerical-aperture objective may be used with the same light source and optical path used for the interferometric measurement.

The present invention is based on the realization that the reference signal described in the referenced patent application provides a solution to the problem of stitching interferometric profiles without requiring spatial continuity between them. Accordingly, this disclosure also enables stitching without normalization of the profile data to a common reference plane and without recourse to other equivalent solutions.

BRIEF SUMMARY OF THE INVENTION

The primary objective of this invention is a stitching procedure that permits the accurate combination of separately acquired profiles of different sections of a sample structure into a single composite map without taking measurements of overlapping regions.

Another objective of the invention is the ability to combine the profiles of adjacent sections of the sample structure without normalization to a common reference plane or other equivalent approach.

Another object is the ability to combine the profiles of sections of the sample surface that are not spatially connected to one another, thereby enabling composite profiles of large surface areas where only partial measurements are taken.

Yet another object is the ability to measure temporal variations in the profile of a sample structure even when the profile varies across the entire field of view of the profilometer.

Still another object of the invention is a procedure that is computationally efficient, stable, repeatable and consistent with measured data.

A further objective of the invention is a procedure capable of implementation in real time for on-line applications.

Another goal of the invention is its general application to conventional interferometric profilers without limitation as to any specific field of testing.

Another objective is an approach that may be used with any topographic instrument, whether to measure a surface, or a boundary or map of features within a structure, and an approach that can be implemented in equivalent fashion using an interferometric reference signal or other precision device for tracking the position of the scanner during measurements.

Finally, another goal is the implementation of the above mentioned objectives in a system that utilizes existing sensory, computing, and other hardware devices.

In accordance with these and other objectives, the preferred embodiment of this invention consists of a reference signal dedicated to providing a full history of scanner motion during each measurement scan. The reference signal is independent of the fringes collected for profile-measurement purposes and is used only to produce a correct z-position history of the scan. This is then advantageously utilized as a reference for correlating all independent profile measurements. The profiles obtained by the successive measurement of each sample-surface section are generated with reference to the scanner positions associated with the reference-signal history collected during the scan, and the various profiles are then combined using their respective reference-signal histories as the correlating factor. As a result, errors caused by scanner nonlinearity and lack of repeatability are removed from the process and the measurement of overlapping regions is no longer necessary to avoid offset errors. Accordingly, it is possible to combine profiles of sample-surface sections that are spatially disconnected without loss of precision attributable to scanner imperfections. Similarly, it is possible to measure temporal changes in the sample profile without reference to an area of unchanged topography.

Various other purposes and advantages of the invention will become clear from its description in the specification that follows, and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose only some of the various ways in which the invention may be practiced.

DESCRIPTION OF THE PREFERRED EMBODIMENTS OF THE INVENTION

This invention lies in the recognition that the reference signal disclosed in Ser. No. 09/888,826 for the purpose of correcting scanner nonlinearities could also be used advantageously as a correlating reference to overcome the scanning errors experienced during data acquisition of interferometric stitching procedures. As a result of this independent reference source, the prior-art need for measuring overlapping regions of adjacent sections is avoided and spatially separated profiles of the sample surface can be independently measured and combined directly without further processing. Furthermore, the concept of the invention is equally applicable to other profiling apparatus and can be implemented with other, non-interferometric, reference signals.

The invention is described with reference to x, y and z orthogonal coordinates wherein x and y define the plane approximately parallel to the test surface and z defines the vertical scanning direction, but it is obvious that the structure and operation of the features detailed in this specification can be rotated in any direction with equivalent results. Thus, "vertical scan" is intended to refer to any motion of a component in profilometric apparatus required to produce a measurement in a sample. The term "correlogram" is used to refer to the three-dimensional set of interferograms produced by a multistep scan during a conventional interferometric measurement. "Nominal" phase step and "nominal" scan step refer to the design phase step and the corresponding design scan step, respectively, of the interferometric scanner.

The inventive concept of Ser. No. 09/888,826, hereby incorporated by reference, resides in the idea of using a reference signal to track the actual behavior of the scanner in an interferometer to produce scanner-position data that can be used directly to calculate the height map of a sample surface, thereby avoiding dealing with the errors introduced by scanner nonlinearities and other error sources. A narrow-band light source is preferably utilized, so that the entire range of operation of the scanner may be advantageously covered. The invention is suitable for implementation with all types of conventional interferometric techniques.

Figure 1:
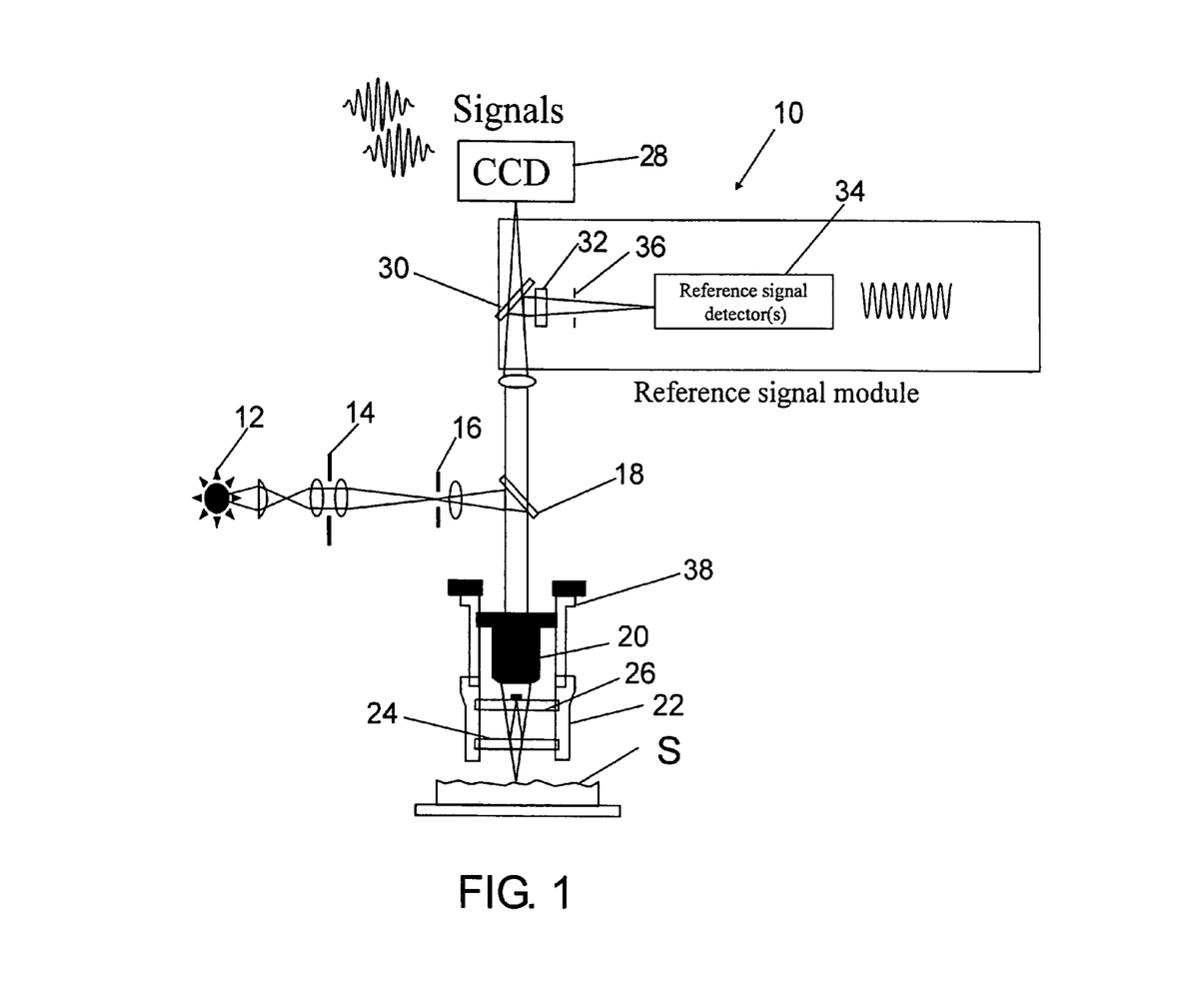
FIG. 1 is a schematic representation of a conventional interferometric profiler including a reference-signal channel according to the present invention in the form of a beam-splitter in the detection path to reflect a portion of the light toward a narrow-bandwidth filter, a stop, and a reference-signal detector.

For example, the reference signal may be acquired by adding a channel in the detection part of the interferometer. Referring to the drawings, wherein like parts are designated throughout with like numerals and symbols, FIG. 1 illustrates in schematic view the basic configuration of a conventional interference microscope modified to produce a reference signal according to this concept. The interferometer 10 comprises a light source 12 directing a beam of light through an aperture 14 and field stop 16 toward a beam splitter 18, which reflects the light in the direction of a test surface S. The light reflected by the beam splitter 18 passes through a microscope objective 20 focused on the test surface S. The objective incorporates an interferometer 22, such as Mirau, comprising a beam splitter 24 and a reference mirror 26 adapted for relative movement with respect to the test surface, so that two light beams are generated for producing interference fringes as a result of the optical path difference between the reference mirror and the test surface S. The beams reflected from the reference mirror 26 and the test surface S pass back up through the optics of the microscope objective 20 and through the beam splitter 18 to a solid-state detector array 28 in a camera in coaxial alignment with the objective 20. Typically, the detector array 28 consists of individual CCD cells or other sensing apparatus adapted to produce a two-dimensional array of digitized intensity data corresponding to light signals received at each sensor cell as a result of the interference of the coherent light beams reflected from individual x-y coordinates or pixels in the surface S and from corresponding coordinates in the reference mirror 26. Appropriate electronic hardware (not shown) is provided to transmit the digitized intensity data generated by the detector to a microprocessor for processing. The microscope objective 20, as well as the interferometer typically incorporated within it, is adapted for vertical movement to focus the image of the test surface on the detector array 28.

According to the invention described in Ser. No. 09/888,826, some of the light directed to the measurement-signal detector 28 is diverted by a beamsplitter 30 to a reference channel, where the light is passed through a narrow bandwidth filter 32 and collected by a reference-signal detector 34. The filter 32 is judiciously selected to provide a long coherence length, as required to obtain usable irradiance data during the entire length of the scan. This approach has the advantage that the reference signal travels much of the same path as the measurement light, thus providing accurate information about the OPD change rate during the scan. For low numerical-aperture (NA) lenses, this is a convenient way to implement the reference-signal idea. For high NA lenses, though, interference fringes become visible for smaller OPDs than would result simply from the coherence of the light source (this is because of the interaction among rays hitting the object's surface at high angles). Thus, the use of a narrow-bandwidth filter alone in the reference signal channel does not appreciably extend the signal range with respect to the measurement path. However, the influence of the lens's numerical aperture can be minimized by inserting an aperture stop 36 in front of the reference detector 34 to limit the effective NA of the lens and provide the required large depth of fringe visibility.

As the scanner 38 of the interferometer 22 scans through its vertical range of operation, the reference signal is recorded in conventional manner and the irradiance data so collected are used to calculate the actual z position of the scanner at each acquisition frame. Any of the many interferometric techniques used in the art for calibration of profiler scanners and/or interferometric analysis (including methods used in distance measurement interferometry, DMI) can be utilized to calculate the distance between frames corresponding to each scanning step. For example, an average step size between frames can be calculated from a few intensities registered at each pixel using the well-known Schwider algorithm, which produces the average phase step (in radians) of four steps between five consecutive frames as follows:

$$\Delta\Phi_{avg}=\arccos(I5-I1)/[2(I4-I2)] \quad (1)$$

where I1–I5 are five consecutive frames (1–5) of intensity data measured for a given pixel around the frame of interest (typically frame 3 in the sequence of 5, but the value could be used equivalently with respect to any intermediate step between frames 1 and 5). Similar algorithms may be used, such as the arctangent function disclosed as preferred in Ser. No. 09/888,826.

Since the reference-signal light source is preferably selected to have a coherence length covering the entire scanning range of the interferometer, sufficient contrast is available during the entire scan and no calculation of modulation threshold is necessary. Thus, a good approximation of the local phase step can be calculated throughout the scan based on the registered correlogram generated by the reference signal. For processing convenience, the nominal phase step of current interferometric apparatus is typically calibrated to produce a phase change of $\pi/2$ or $3\pi/2$ at the mean wavelength $\lambda$ being used, with a corresponding optical-axis scan step of $\lambda/8$ and $3\lambda/8$, respectively.

One advantage of the technique is that the phase step can be calculated during the scan with each consecutively collected reference-signal irradiance data and the resulting true step-size values can then be used with any interferometric technique to correct scanner-motion deviations from the calibrated trajectory. That is, the scanner positions obtained from the reference signal are used directly to produce the profile of the sample surface. This correction can be carried out "on-the-fly" to obtain an immediate precise measurement or after the scan is completed; in the latter case, the correct step sizes are used in the form of a look-up table.

Whether phase shifting interferometry (PSI), vertical scanning interferometry (VSI, also referred to as white-light interferometry), a combination of VSI and PSI, phase shifting interferometry on-the-fly (PSIOTF), or lateral scanning interferometry (LSI, disclosed in Ser. No. 09/569,131) is being implemented, the step sizes produced by Equation 1 or any equivalent function with reference-signal irradiance data can be used directly in the processing routines for the measurement-signal data instead of the nominal scanner values. As those skilled in the art readily understand, phase steps between frames (expressed in radians) are routinely converted to scanner step sizes (expressed in nm or other length dimension) when the information about the wavelength of the light used is taken into account.

Figure 2:
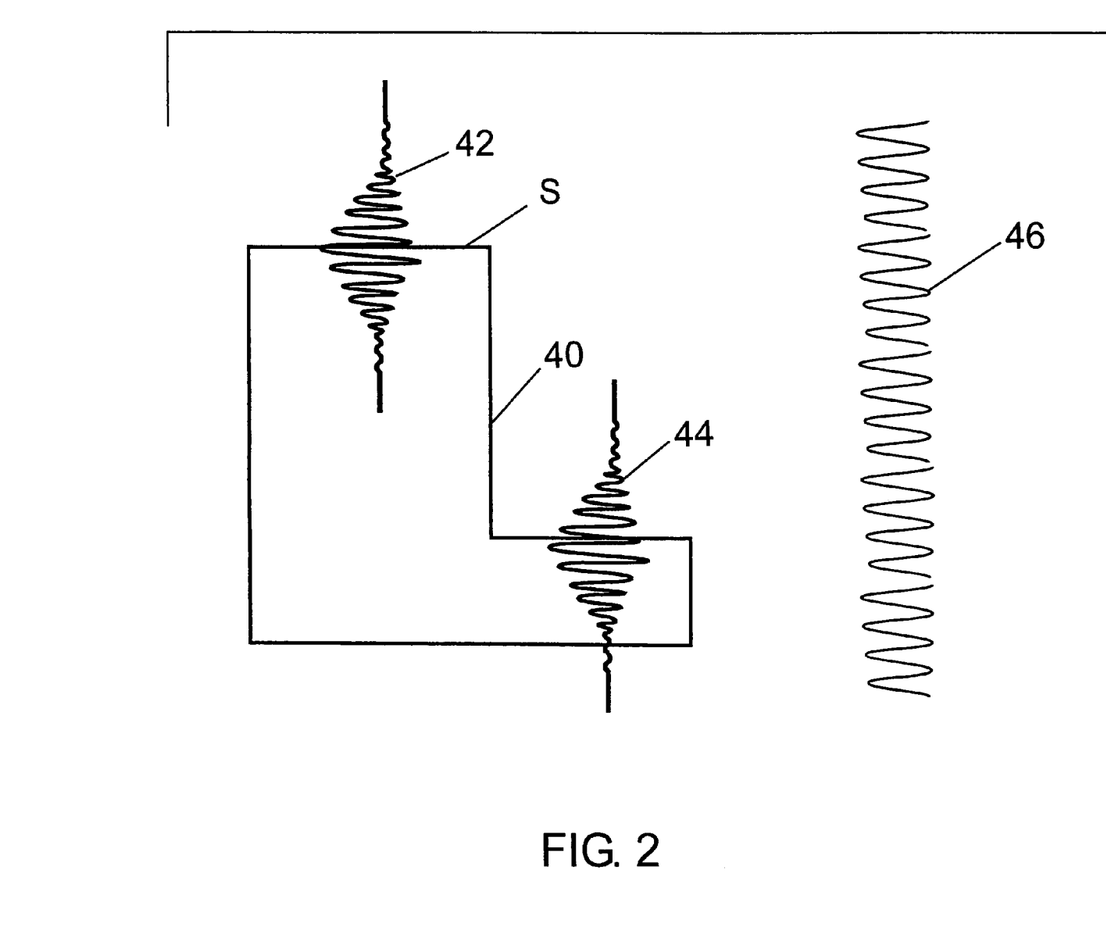
FIG. 2 shows a large interpixel step in a test surface and corresponding measurement and reference modulation curves to illustrate the advantages of using a reference signal concurrently with the acquisition of profiling data.

The advantage of using the reference signal of the invention for measuring phase steps and determining scan positions is illustrated by the examplary modulation curves depicted in FIG. 2. In the typical situation where a test surface S features a large interpixel step 40 (as shown), a VSI technique with a low-coherence light source is generally used to profile the surface. In such cases, the modulation information for the pixels separated by the step 40 (represented schematically by the modulation curves 42 and 44) do not overlap and the relative distance of the two modulation peaks has to be calculated using calibrated scanner step information. That is, the distance between the top and the bottom of the step 40 is calculated using the nominal step size and the number of frames between them. The use of a high-coherence reference signal, depicted by the modulation curve 46, provides continuous information about the quality and history of the scan even when no signal is produced by the measurement channel of the instrument.

Figure 3:
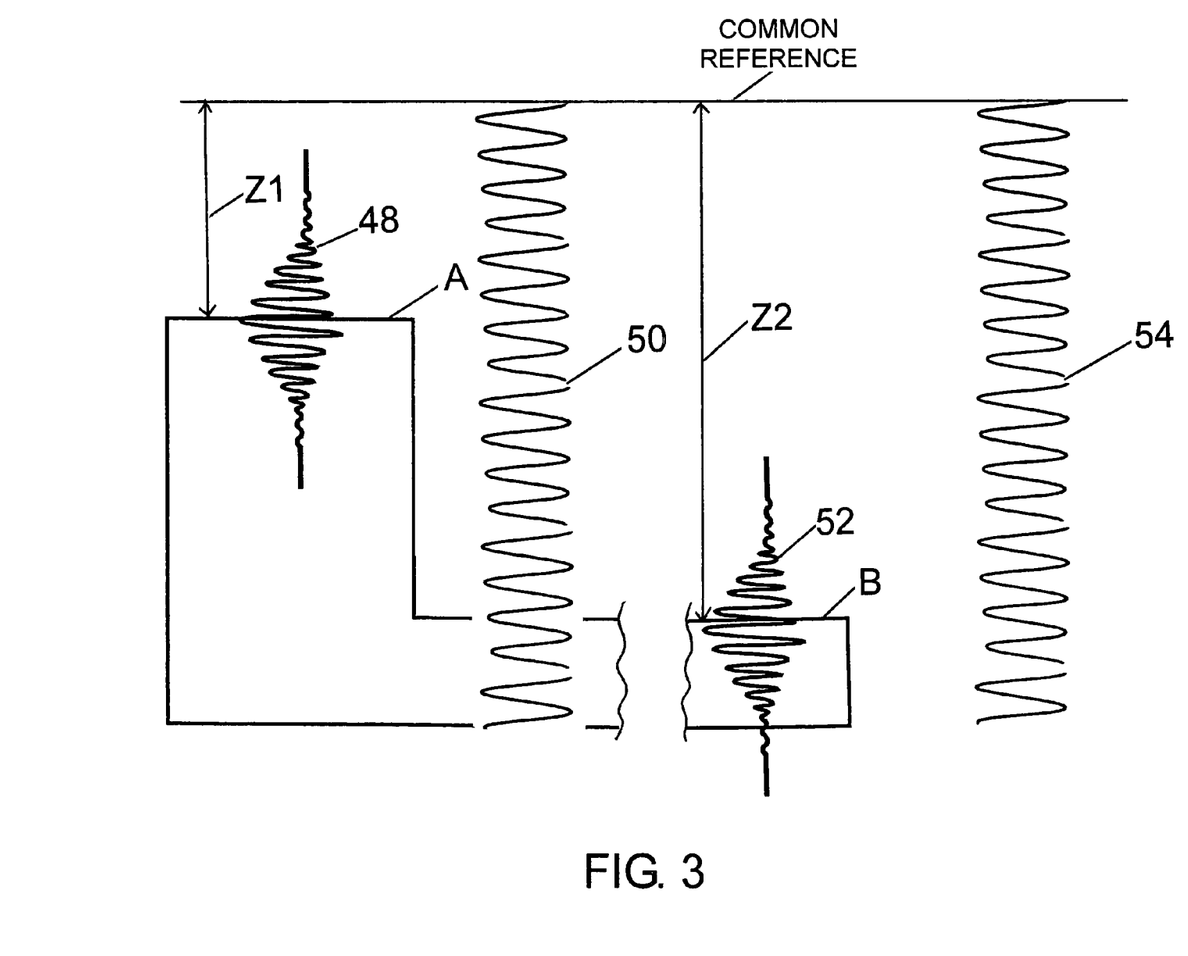
FIG. 3 shows a step between two separate sections of a test surface and corresponding measurement and reference modulation curves to illustrate the use of a reference signal to correlate and combine the height profiles of the sections into a composite map according to the present invention.

Another advantageous consequence of the continuous scan information provided by the reference signal, which is the basis for the present invention, is that it can be used as a correlating reference between successive scans taken over spatially discontinuous sections of the sample surface (as well as temporally discontinuous measurements of the same section). As illustrated in FIG. 3 for two exemplary pixels of separate sections A and B of the sample surface S, the z position of the pixel in section A is estimated during a first scan by the peak of the modulation curve 48 with reference to a corresponding reference signal represented by the modulation curve 50. Inasmuch as the reference signal is produced to overcome scanning nonlinearities and other scanning errors occurring during such first scan, as detailed above, the modulation curve 50 provides a correct representation of scanner position at each scanning step. The z position of the pixel on surface B is similarly estimated by the peak of the modulation curve 52 during a subsequent scan with reference to a corresponding reference signal represented by the modulation curve 54. The modulation curve 54 also provides a corrected history of the subsequent scan. Therefore, it also provides a correct representation of scanner position at each step with respect to a fixed reference, such as the origin of the scan, which can be used advantageously to correlate the measurements produced by the two independent scans.

So long as the scanner position is always tracked and based on the reference signal, each profile generated by separate scans is measured with reference to known scanner positions. Therefore, a common reference is provided by the reference signal and separate profiles can be combined into a composite map regardless of scanner nonlinearities because of the corrective effect produced by the reference signal. For example, if the z position of the measured pixel of surface A is calculated to be z1 with reference to the origin of the scanner range using the reference signal, and if the z position of the measured pixel of surface B is similarly calculated to be z2, it is clear that the relative height distance between the two pixels (i.e., z1–z2) is independent of errors introduced by scanning nonlinearities. Therefore, the two measurements can be combined to produce a correct single composite map without further processing of the data. That is, stitching of separately acquired profiles can be carried out without the need to maintain regions of overlap between measurements and without further processing of the profile information. This property of the invention is very advantageous when a sample surface contains only separate regions of interest.

It is noted that this invention does not provide a method for correcting offset errors (i.e, z position errors) generated by the relative translation of the sample surface with respect to the interferometric objective in the x,y plane. It is only directed at correcting offset errors produced by nonlinearities and other imperfections of the scanning mechanism. With the current state of the art of precision motion, though, these latter errors are significantly larger than x,y translation errors. Therefore, the assumption of ideal x,y translation is acceptable if mechanisms of appropriate mechanical quality are used.

The invention can also be used to measure surfaces that change with time as a result of environmental effects. Because each independent measurement is tied to the same reference system, different measurements can be compared meaningfully without recourse to an area of unchanged topography to provide the reference necessary to correlate the measurements. This property is useful, for example, for measuring vertical shifts of MEMS (micro electro-mechanical systems) micro-mirror devices.

The common-path reference-signal implementation illustrated in FIG. 1 is an inexpensive way of providing the necessary information about scanner motion, but it can be limited by the amount of light available for detection after reflection by the beamsplitter 30. Also, the reference-signal acquisition process is necessarily limited to the same predetermined location on the sample surface corresponding to the location of the reference signal in the image plane of the detector. This limitation may affect the quality of the reference signal depending on the sample being measured.

Figure 4:
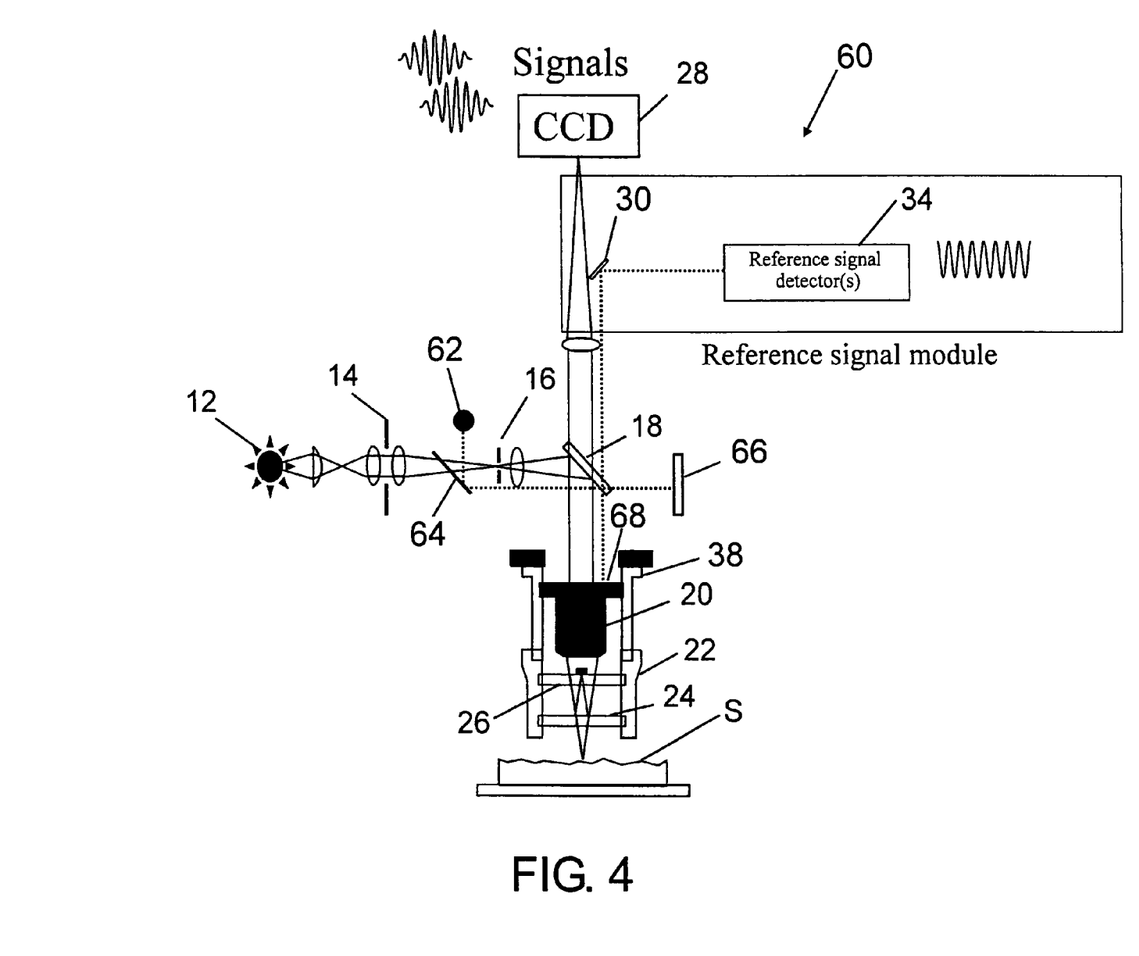
FIG. 4 is a schematic representation of an embodiment of the invention with an internal reference interferometer sharing part of the optical path with the profilometer.

According to another embodiment 60 of the invention, illustrated in FIG. 4, an additional reference-signal interferometer is built into the conventional measurement interferometer of the instrument and is dedicated to monitor OPD changes through a separate reference-signal channel. The two interferometers can share a significant portion of the profiler's optics (such as the beam splitter 18 and various lenses), but provide independent signal channels that can be tuned separately without affecting either the measurement or the reference path. In one implementation of this embodiment, a laser 62 is used to provide enough light for a good-quality reference signal and a beamsplitter 64 is added in the optical measurement path to direct the laser beam toward the main splitter 18. A portion of the light is passed through to a reference mirror 66 for the reference signal, while the balance of the light is reflected toward a mirror or other reflective element 68 (such as a corner cube or a reflecting grating) placed on the moving part of the scanner 38 of the measurement interferometer.

Figure 5:
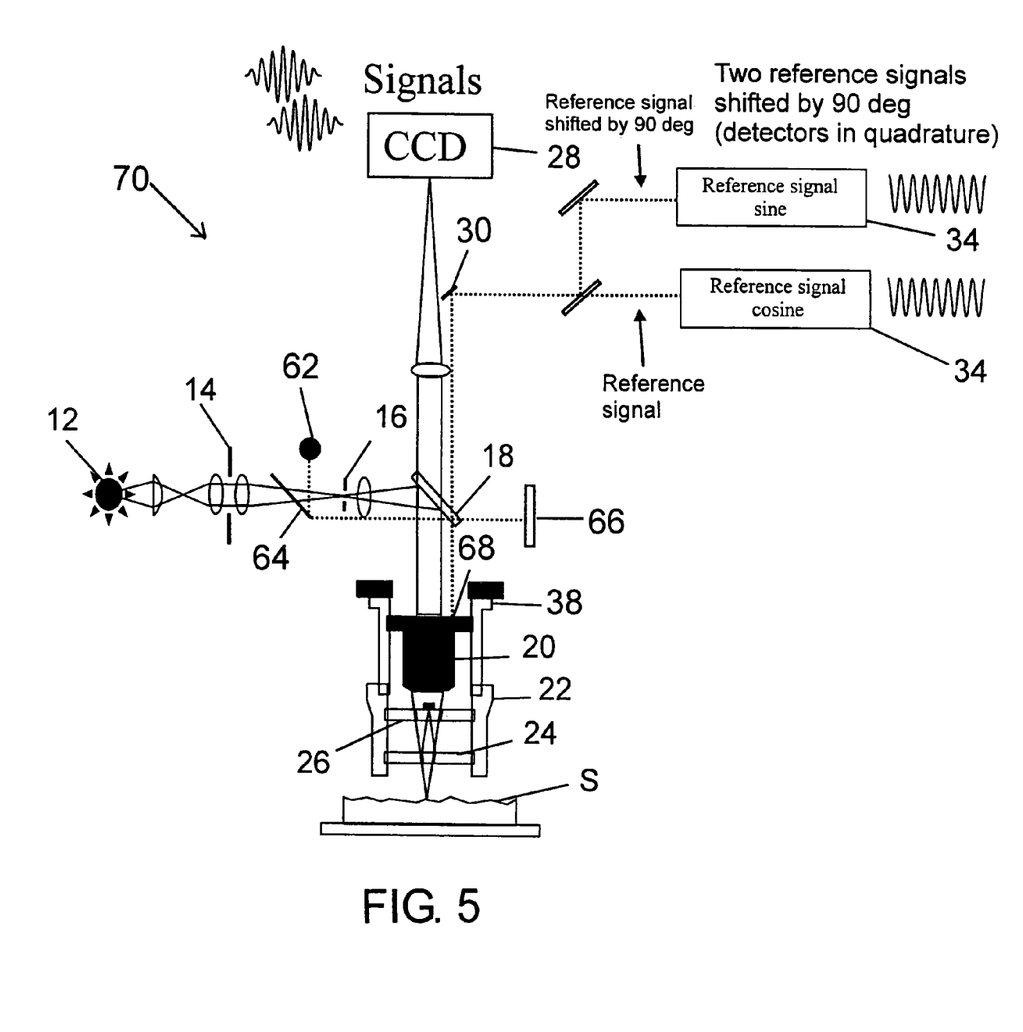
FIG. 5 is a schematic representation of the preferred embodiment of the invention having two reference detectors adapted to receive two reference signals in quadrature.

In the preferred embodiment 70 of the invention, illustrated in FIG. 5, the reference signal is split into two signals shifted by 90 degrees (in software or by means of optical elements), which are then used as reference signals in a synchronous detection technique. As one skilled in the art would readily understand, the phase of one of the signals and correspondingly the position of the scanner can be determined directly from the synchronous reference signals in quadrature using any DMI technique. At each pixel, the phase of the measured signal with respect to the reference signal is determined for every frame. Then, this phase is added to a real shift (position) of the scanner determined from the reference signal.

Figure 6:
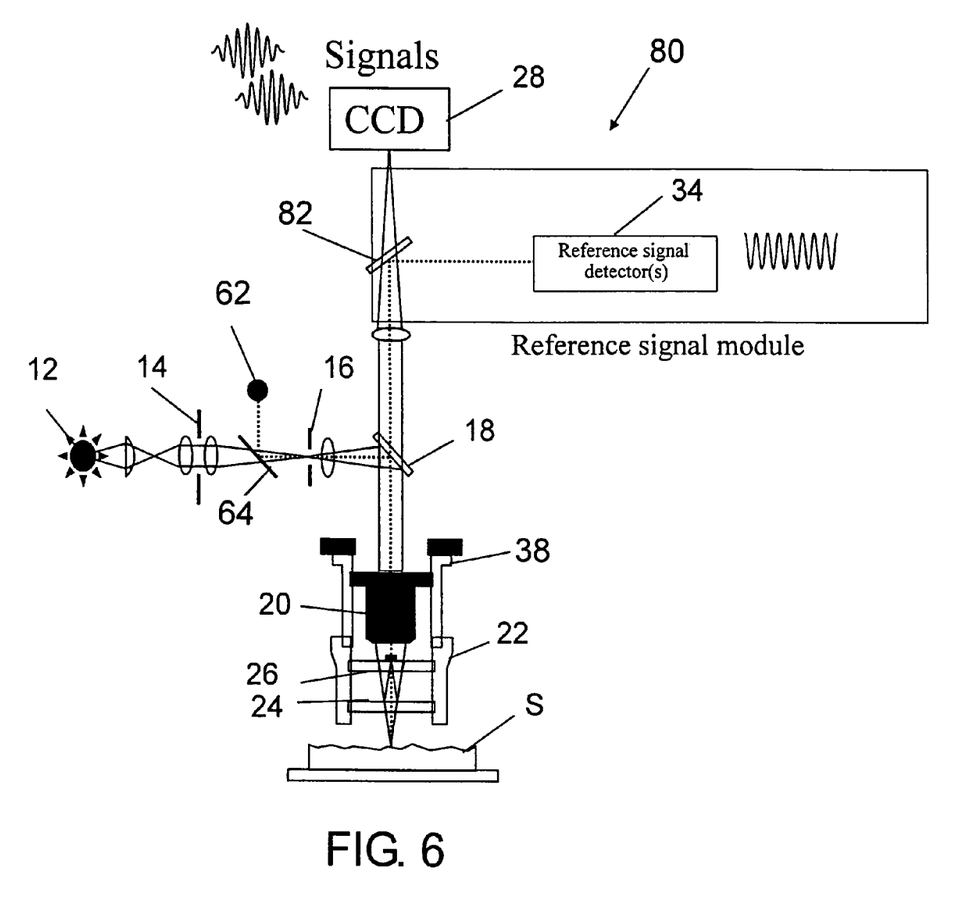
FIG. 6 is a schematic representation of an embodiment including a reference-signal channel in the form of a separate laser source with a central wavelength outside the bandwidth of the broadband source, so that it can be selectively directed by a dichroic filter to a reference-signal module.

According to another embodiment 80 of the invention illustrated in FIG. 6, the separate laser source 62 is used for the purpose of producing a reference signal that shares the optical path of the measurement light. Instead of the narrow-bandwidth filter 32 of FIG. 1, the wavelength selection is done by a dichroic filter 82 that deviates the laser light towards the reference-signal detector 34 and blocks its passage towards the measurement-signal detector 28. As those skilled in the art would readily understand, the bandwidth of the measurement light is either not affected, or only altered in a very narrow bandwidth, which can be taken into account during analysis of the measurement data.

The advantage of this approach is that more light is available for the reference detector 34. Accordingly, the narrow width of the laser beam and the narrow bandwidth of its wavelength produce many good-contrast fringes over a long scanning range. Moreover, the reference signal is available to monitor changes in OPD directly and independently of the measurement signal.

Figure 7:
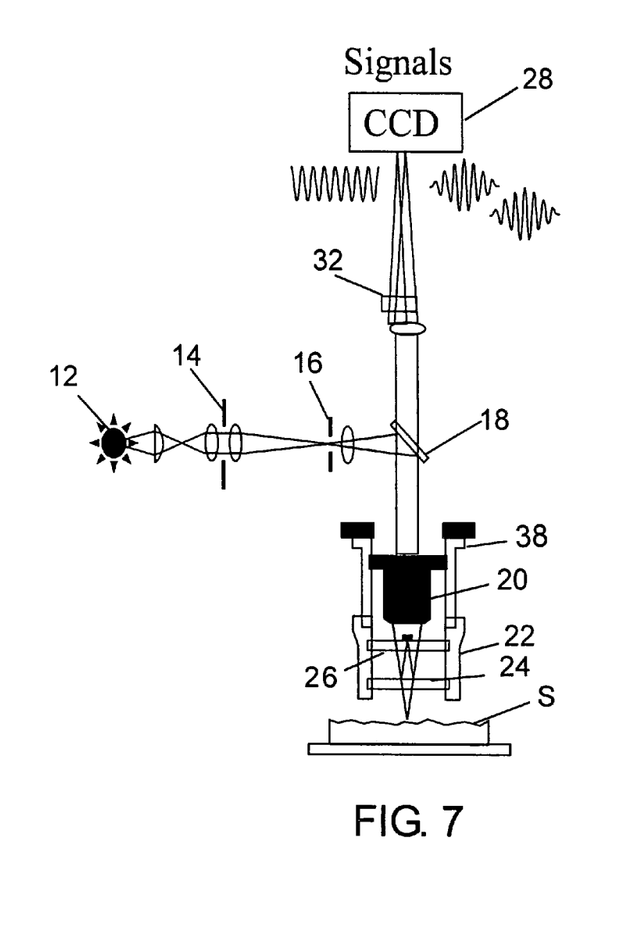
FIG. 7 is a schematic representation of an embodiment where the measurement detector, instead of a separate reference detector, is also used for the reference signal.

The concept of the invention can also be implemented in a system where the reference signal is recorded using the same in FIG. 7 with reference to the embodiment of FIG. 1. In such a case, a portion of the measurement beam is passed through a narrow-band filter 32 prior to detection by particular pixels in the measurement detector 28. In this configuration, the reference signal does not record actual changes in the profiler/object distance, but, under the commonly accepted assumption that most system errors are generated by the scanner, this simple approach can be used advantageously to provide a reference signal that tracks scanner motion. At the same time, the approach affords a great degree of freedom in the selection of the light source for the reference signal and no other optical elements need to be introduced in the measurement path. Also, the reference-signal acquisition location on the object's surface is not limited to a preselected position.

Using any of the disclosed embodiments for data collection, Equation 1 or alternative algorithms may be employed for calculating the phase step between frames directly from a sequence of reference-signal intensity data collected during the scan. The value of the effective wavelength used for the reference signal is selected for good results and is kept as constant as possible. However, as is well understood in the art, the effective wavelength detected by the camera may vary with different bulb intensities because of the fairly large bandwidth used for the measurement channel. For example, in VSI a large bandwidth is used to produce a contrast peak; when the intensity of the light source is changed to adjust the measurement, changes in the mean wavelength may also occur. In addition, the effective wavelength of the measurement light is typically not as well known as for laser or narrow-bandwidth filtered light. By having a constant wavelength in the reference signal, it is also possible to measure changes due to scanner motion and vibrations and to determine to what degree the effective wavelength of the measurement light detected by the camera is affected by either the bulb's characteristics (i.e. changes in voltage and time) or by spectral reflectance of the material.

The invention can be implemented with a single point detector for the reference signal, or with a multiple point detector to reduce the influence of noise. Alternatively, in order to reduce the noise in the average phase calculated from the reference signal, a second camera can be used to detect reference-signal fringes of high coherence from an entire surface, rather than from a few pixels.

Figure 8:
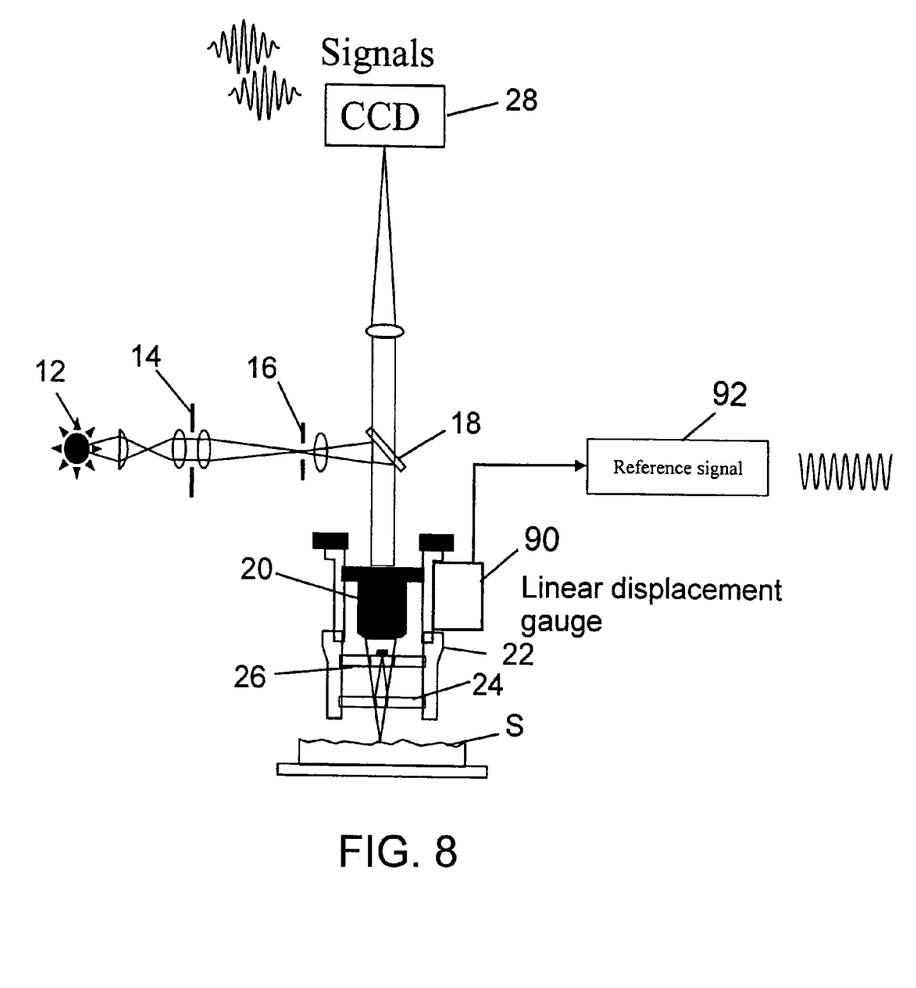
FIG. 8 is a schematic representation of an embodiment of the invention wherein the reference signal is produced by non-optical means.

It is also noted that the invention has been described in terms of an optical reference signal, but one skilled in the art would readily appreciate that it must not necessarily be so. The important feature of the invention is the idea of providing a measure of actual scanner motion with respect to a known position independent of the interferometric measurement data acquired during the scan. Therefore, any position device 90 that provides a precise measure (through appropriate hardware 92) of the scanner's relative displacement with respect to a known position in the z direction at each data acquisition frame would be suitable for practicing the invention in equivalent manner, as illustrated in FIG. 8. For example, currently available displacement gauges, such as linear encoders, capacitive sensors, linear variable differential transformers (LVDTs), and eddy-current sensors (all represented schematically by reference numeral 90), provide measurements with precision in the order of nanometers which could be used advantageously to practice the invention.

Figure 10:
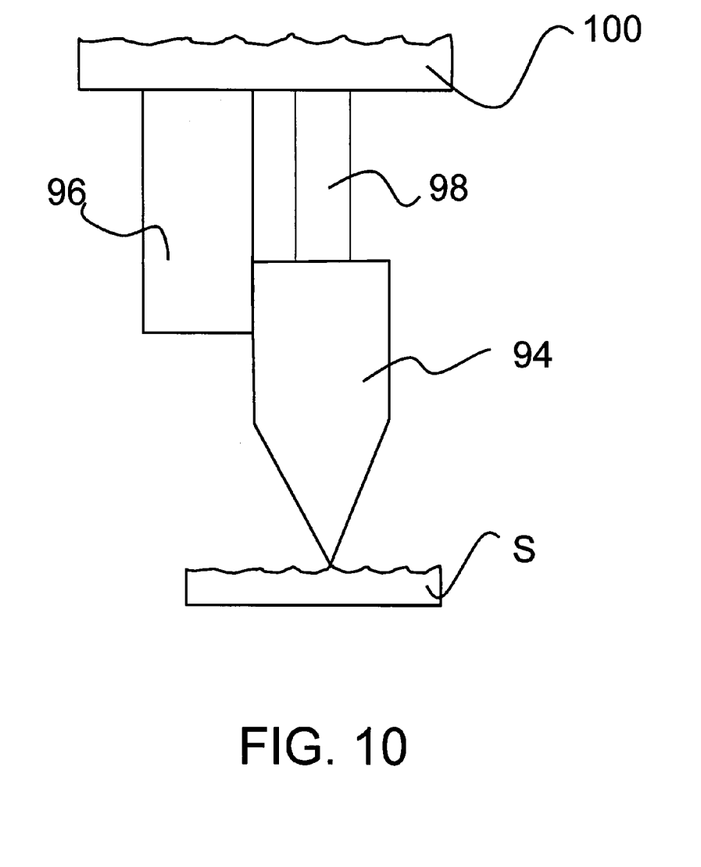
FIG. 10 is a schematic diagram illustrating the generic applicability of the concept of the invention to any topographic profiler that uses a scanning mechanism to effect profiling measurements in combination with any position gauge capable of determining the position of the scanner during the measurement operation.

Similarly, the concept of the invention is applicable to topographic apparatus other than interferometric profilometers. In particular, confocal microscopes, stylus profilometers, and atomic-force microscopes, all of which effect surface measurements by recording the vertical position of a measuring unit during a vertical scan of the surface, can be advantageously coupled to an independent reference signal device to overcome the same problems discussed above with regard to interferometric apparatus. The concept can also be used in confocal microscopy and optical coherence tomography, where the map of interest is an internal feature of a sample structure, such as an interface between separate solid phases. The general applicability of the invention is illustrated schematically in FIG. 10, wherein component 94 refers to a generic topographic profiler (including any of the ones mentioned above) that uses a scanning mechanism 96 to effect profiling measurements, and component 98 similarly refers to a generic reference position gauge used to determine the scanning position with respect to a fixed reference 100 during the measurement operation.

Figure 9:
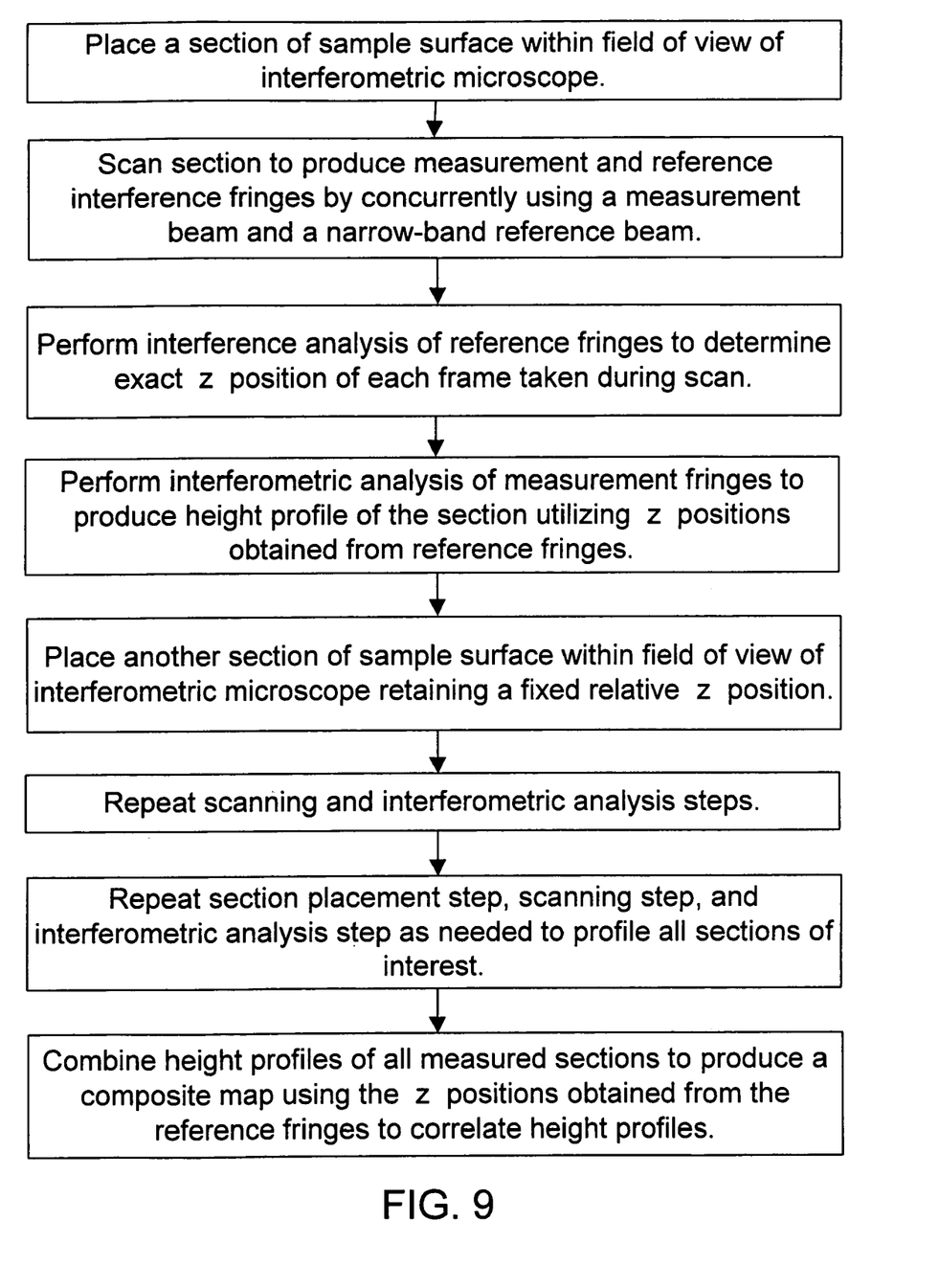
FIG. 9 is a flow-chart of the steps of the procedure of the invention.

Thus, independently of the precise apparatus used to implement it, the invention consists of taking successive measurements of different sections of interest in a sample structure or surface. As each section is scanned, the position of the scanner along the scanning range is tracked precisely at each data-acquisition frame and the scanner's position history is correlated with the interferometric data generated by the scan to provide a height profile that is unaffected by scanner nonlinearities and inconsistent performance (lack of repeatability). A reference signal operated in parallel with the measurement unit is most preferably used to track the scanner position. As the relative x,y position of the sample surface or structure and the measurement unit is shifted between scans, the scanner's vertical position is kept unchanged or is tracked precisely with reference to the last reference-signal position history, so as to provide a reference for the subsequent scan. Thus, the profiles generated by the various scans over different sample sections can be combined directly to form a composite profile. The steps of the invention are illustrated in the diagram of FIG. 9.

Various changes in the details, steps and components that have been described may be made by those skilled in the art within the principles and scope of the invention herein illustrated and defined in the appended claims. For example, it is understood that the reference signal in the interferometric implementation of the invention may be sampled advantageously at much higher rates (e.g., at $\pi/100$) than the measurement signal, thereby reducing the effect of noise. Since irradiance signals are essentially sinusoidal, the reference value corresponding to each measurement frame can then be fitted in conventional manner to provide better information than could be derived from sampling at the measurement rate.

As one skilled in the art would readily understand, the invention can be readily combined with variable-speed scanners used to measure surfaces separated by large steps. Since the reference signal provides continuous information about the exact position of the scanner, rapid vertical translations can be effected reliably without concern for the loss of precision due to scanner's errant motion. Similarly, the reference signal can be used advantageously to start the scan of a sample surface from any arbitrary vertical position. The reference signal always provides a position reference in relation to which the information collected from a scan can be processed.

Therefore, while the present invention has been shown and described herein in what is believed to be the most practical and preferred embodiments, it is recognized that departures can be made therefrom within the scope of the invention, which is not to be limited to the details disclosed herein but is to be accorded the full scope of the claims so as to embrace any and all equivalent processes and products.

We claim:

1. A method of producing a topographic map of a test structure using a scanning unit, the method comprising the following steps:
   scanning a section of said test structure with said scanning unit to generate first topographic data;
   scanning a section of said test structure with said scanning unit to generate second topographic data;
   sensing the position of said scanning unit to generate positional reference data for said scanning unit;
   producing a first topographic map employing said first topographic data independently of said positional reference data;
   producing a second topographic map employing said second topographic data independently of said positional reference data; and
   adjusting for positional variation of said scanning unit between the scanning steps employing said positional reference data independently of said topographic data.

2. The method of claim 1, further comprising the step of combining said first topographic map with said second topographic map to form a composite map, the adjusting step including establishing a relative position between said first and second topographic maps.

3. The method of claim 2, wherein one of the scanning steps is performed on a first section of said test structure and the other of the scanning steps is performed on a different second section of said test structure, the combining step including forming a composite spatial map from said first and second topographic maps.

4. The method of claim 2, wherein the scanning steps are performed at different times on the same section of said test structure, the combining step including forming a composite temporal map from said first and second topographic maps.

5. The method of claim 1, wherein the adjusting step comprises establishing a relative position between said first and second topographic maps.

6. The method of claim 1, wherein the sensing step comprises detecting said scanning unit during each of the scanning steps.

7. The method of claim 1, wherein said scanning unit is designed to scan over a range of scanning operation and the sensing step is performed using a reference signal of coherence length sufficient to cover said range.

8. The method of claim 1, wherein said scanning unit is designed to scan over a range of scanning operation and is calibrated to produce a sequence of nominal phase steps within said range.

9. The method of claim 8, wherein each of said nominal phase steps is $\pi/2$.

10. The method of claim 8, wherein each of said nominal phase steps is $3\pi/2$.

11. The method of claim 1, wherein the sensing step comprises generating interference patterns for said scanning unit; and further comprising the step of performing an irradiance analysis on said interference patterns to determine said positional reference data.

12. The method of claim 11, wherein said interference patterns are generated by directing a reference signal toward a reflective surface and a reference surface aligned in an optical path.

13. The method of claim 12, wherein said reference signal is produced by a narrow-bandwidth source.

14. The method of claim 12, wherein at least one of the scanning steps comprises directing a measurement signal toward said test structure, said reference signal being produced by passing a portion of said measurement signal through a narrow-bandwidth filter.

15. The method of claim 12, wherein at least one of the scanning step comprises directing a measurement signal toward said test structure, said measurement signal and said reference signal being substantially coextensive.

16. The method of claim 12, wherein the sensing step comprises producing two derivative signals in quadrature from said reference signal, and detecting each of said derivative signals independently of the other.

17. The method of claim 12, wherein said reflective surface is mounted on said scanning unit.

18. The method of claim 12, wherein said reflective surface is associated with said test structure.

19. The method of claim 1, wherein the sensing step is performed using a linear encoder.

20. The method of claim 1, wherein the sensing step is performed using a capacitive sensor.

21. The method of claim 11, wherein the sensing step is performed using a linear variable differential transformer.

22. The method of claim 1, wherein the sensing step is performed using an eddy-current sensor.

23. The method of claim 1, wherein the scanning steps are performed using an interferometric profiler.

24. The method of claim 1, wherein the scanning steps are performed using a confocal microscope.

25. The method of claim 1, wherein the scanning steps are performed using a stylus profiler.

26. The method of claim 1, wherein the scanning steps are performed using an atomic-force microscope.

27. The method of claim 1, wherein the scanning steps are performed using an optical-coherence tomographic profiler.

28. Apparatus for producing a topographic map of a test structure comprising:
- a scanning unit;
- means for positioning the test structure and said scanning unit relative to one another so as to permit said scanning unit to perform a scan on a selected section of the test structure;
- means for generating first topographic data from a first scan by said scanning unit and second topographic data from a second scan by said scanning unit;
- means for sensing the position of said scanning unit and for developing positional reference data for said scanning unit;
- means for producing a first topographic map employing the first topographic data independently of the positional reference data and a second topographic map employing the second topographic data independently of the positional reference data; and
- means for adjusting for positional variation of said scanning unit between the first scan and the second scan independently of the topographic data.

29. The apparatus of claim 28, further comprising means for combining the first topographic map with the second topographic map to form a composite map, said adjusting means including means for establishing a relative position between the first and second topographic maps.

30. The apparatus of claim 29, wherein said combining means is designed to form a composite spatial map from the first and second topographic maps when the first scan is performed on a first section of the test structure and the second scan is performed on a different second section of the test structure.

31. The apparatus of claim 29, wherein said combining means is designed to form a composite temporal map from the first and second topographic maps when the first and second scans are performed on the same section of the test structure at different times.

32. The apparatus of claim 28, wherein said adjusting means comprises means for establishing a relative position between the first and second topographic maps.

33. The apparatus of claim 28, wherein said scanning unit is designed to scan over a range of scanning operation, said sensing and developing means comprising means for producing a reference signal of coherence length sufficient to cover said range and for directing the reference signal toward said scanning unit.

34. The apparatus of claim 28, wherein said scanning unit is designed to scan over a range of scanning operation and is calibrated to produce a sequence of nominal phase steps within said range.

35. The apparatus of claim 34, wherein each of said nominal phase steps is $\pi/2$.

36. The apparatus of claim 34, wherein each of said nominal phase steps is $3\pi/2$.

37. The apparatus of claim 28, wherein said sensing and developing means comprises means for generating interference patterns for said scanning unit, and means for performing an irradiance analysis on the interference patterns to develop the positional reference data.

38. The apparatus of claim 37, wherein said interference pattern generating means comprises means for producing a reference signal and for directing the reference signal toward said scanning unit.

39. The apparatus of claim 38, wherein said reference signal producing means comprises a narrow-bandwidth source for the reference signal.

40. The apparatus of claim 38, wherein said topographic data generating means comprises means for producing a measurement signal and for directing the measurement signal toward the test structure, said reference signal producing means including a narrow-bandwidth filter and means for passing a portion of the measurement signal through said filter.

41. The apparatus of claim 38, wherein said topographic data generating means comprises means for producing a measurement signal and for directing the measurement signal toward the test structure, said measurement signal producing means and said reference signal producing means being designed to make the measurement signal and the reference signal substantially coextensive.

42. The apparatus of claim 38, wherein said sensing and developing means comprises means for producing two derivative signals in quadrature from the reference signal and for detecting each of the derivative signals independently of the other.

43. The apparatus of claim 38, wherein said scanning unit is provided with a reflective surface and said reference signal producing means is arranged to direct the reference signal toward said reflective surface.

44. The apparatus of claim 28, wherein said sensing and developing means comprises a linear encoder.

45. The apparatus of claim 28, wherein said sensing and developing means comprises a capacitive sensor.

46. The apparatus of claim 28, wherein said sensing and developing means comprises a linear variable differential transformer.

47. The apparatus of claim 28, wherein said sensing and developing means comprises an eddy-current sensor.

48. The apparatus of claim 28, wherein said topographic data generating means comprises an interferometric profiler.

49. The apparatus of claim 28, wherein said topographic data generating means comprises a confocal microscope.

50. The apparatus of claim 28, wherein said topographic data generating means comprises a stylus profiler.

51. The apparatus of claim 28, wherein said topographic data generating means comprises an atomic-force microscope.

52. The apparatus of claim 28, wherein said topographic data generating means comprises an optical-coherence tomographic profiler.

* * * * *